United States Patent [19]

Weinhaus

[11] 4,386,982
[45] Jun. 7, 1983

[54] METHOD OF MAKING A WATER SKI CONSTRUCTION

[75] Inventor: Harold R. Weinhaus, Southfield, Mich.

[73] Assignee: The Budd Company, Troy, Mich.

[21] Appl. No.: 295,888

[22] Filed: Aug. 24, 1981

Related U.S. Application Data

[62] Division of Ser. No. 176,612, Aug. 8, 1980, Pat. No. 4,314,384.

[51] Int. Cl.³ .................... B32B 31/14; B32B 5/20; B63C 5/12
[52] U.S. Cl. .................................. 156/79; 156/245; 264/46.5; 280/610; 428/71; 428/76; 441/68
[58] Field of Search .................. 52/309.9, 802, 806, 52/809, 743; 9/310 A, 310 R; 156/79, 245; 264/46.5; 280/610; 428/320.2, 71, 76; 441/68

[56] References Cited

U.S. PATENT DOCUMENTS 3,110,370 11/1963 Wulf et al. ........................... 52/802
3,535,844 10/1970 Glaros ............................. 52/802 X
3,635,484 1/1972 Nakamura et al. ................. 280/610

OTHER PUBLICATIONS

Beattie, John O., "Casting Plastics Sheets," Modern Plastics, Jul. 1956, pp. 109–117.

Primary Examiner—Robert A. Dawson
Attorney, Agent, or Firm—Edward M. Farrell; Herman Foster; Thomas I. Davenport

[57] ABSTRACT

A water ski formed of molded upper and lower shells made of sheet molding compound which have mating and overlapping flanges around the entire perimeter of the shells which are bonded together to form a buoyancy chamber. In one embodiment, the chamber is filled with polymerized foam and in another embodiment longitudinally extending ribs are formed to maintain the upper and lower surfaces of the shells in spaced relationship to each other.

3 Claims, 12 Drawing Figures

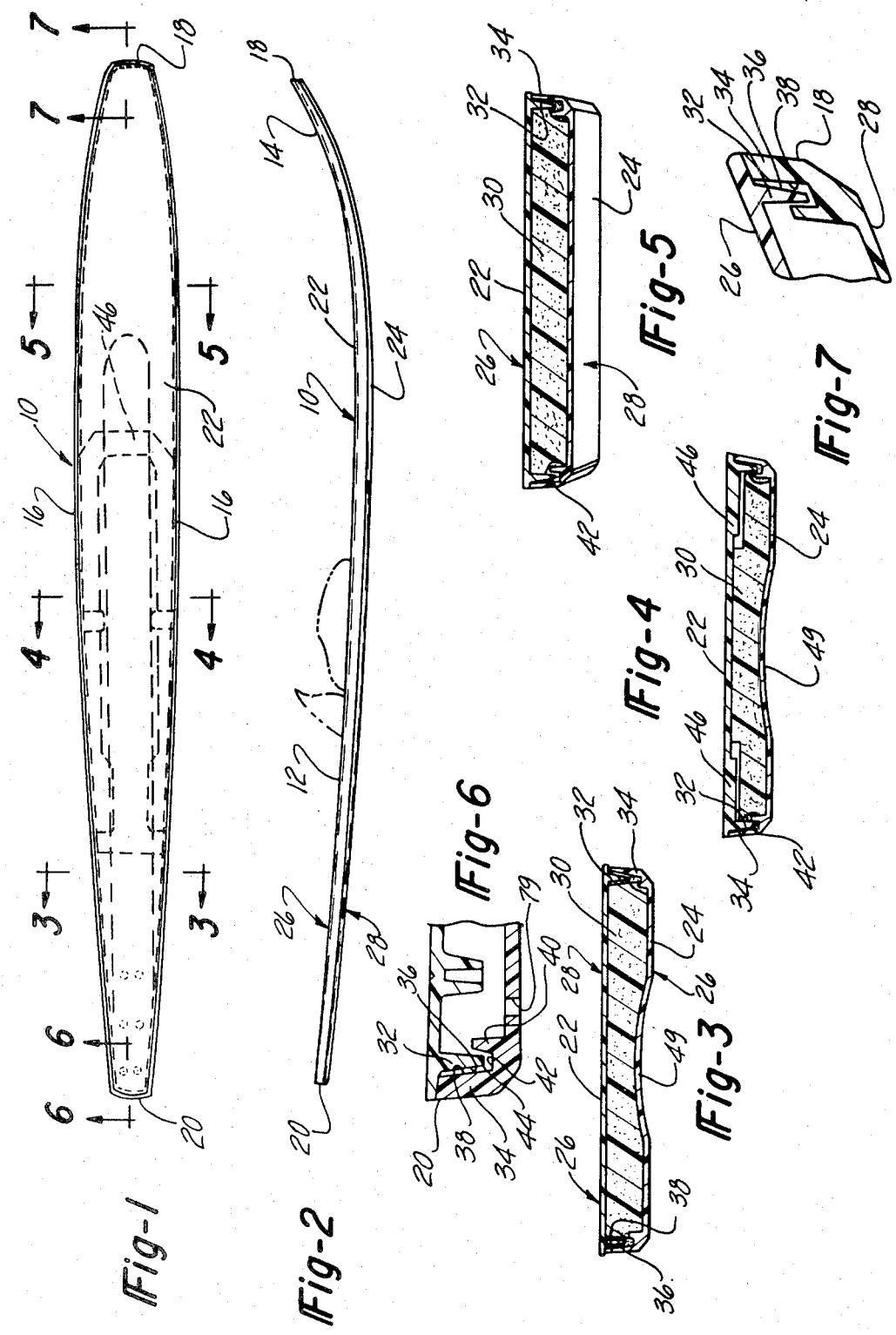

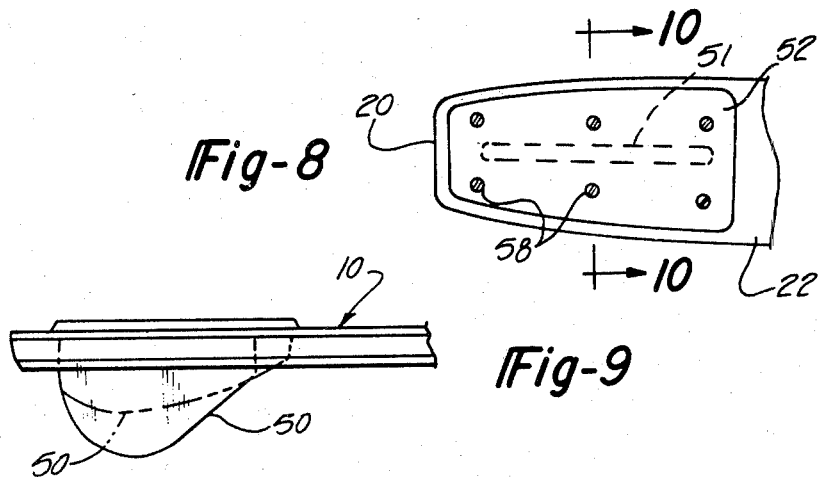
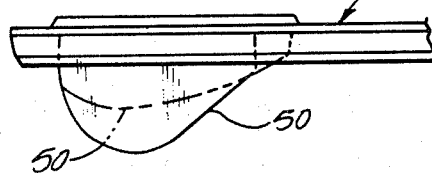
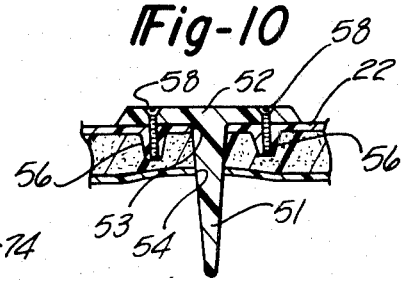
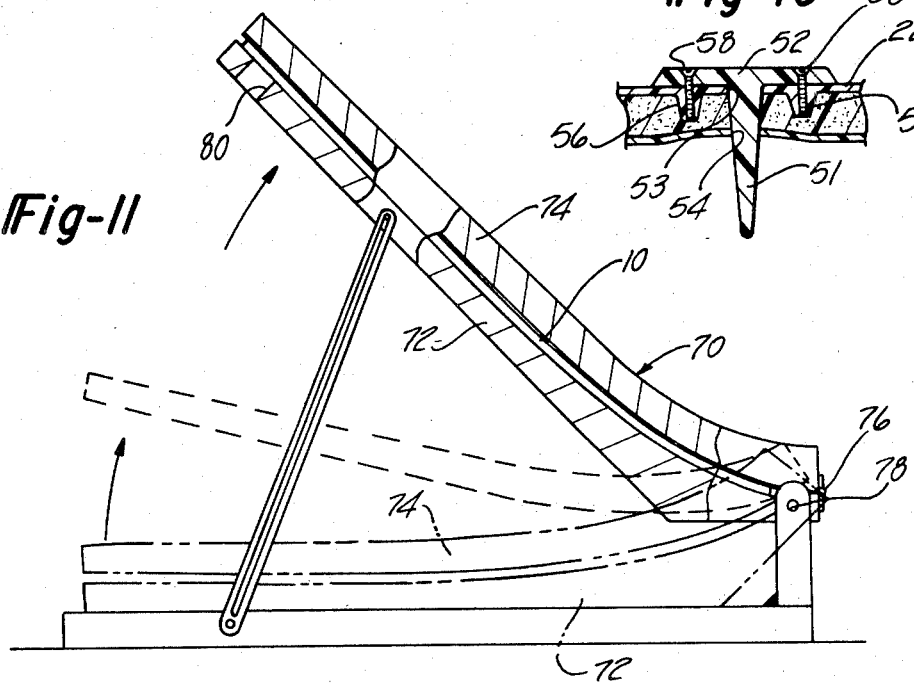
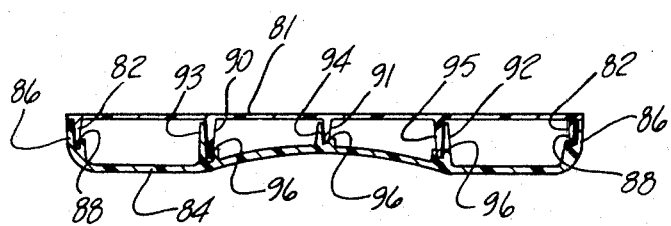

METHOD OF MAKING A WATER SKI CONSTRUCTION

This is a division, of application Ser. No. 176,612, filed Aug. 8, 1980 and now U.S. Pat. No. 4,314,384.

The present invention relates generally to a water ski construction and more specifically to a water ski construction fabricated from synthetic resin.

A variety of ski constructions have been made in which cores of foam, wood or other material are enveloped in a skin of resin reinforced fiberglass materials. Most of such arrangements require hand lay-up and hand craftsmanship or intricately finished molds. Even then such skis typically are limited to a single form with variations requiring substantial duplicate tooling. By way of example, there are two basic types of the more popular forms of water skiing, one of which requires a pair of like skis and the other known as slalom skiing requiring special bindings for placement of both feet of the user on a single ski. In addition to the placement of different forms of bindings for the feet, some skis use fins at the rear underside of the ski. These variations typically require variations in molds and fixtures.

It would be highly desirable and is an object of this invention to provide a water ski construction made of synthetic resinous materials which will accommodate a variety of hardware in the form of foot bindings or can easily be fitted with fins of various configurations.

Another object of the invention is to provide a ski construction in which matching shells are made of sheet molding compound in the form of resin reinforced with fiberglass filaments.

Another object of the invention is to provide a water ski wherein matching shell parts are fastened together to maintain water tight integrity by the use of adhesive disposed between overlapping side flanges of the shells with one of the shells accumulating excess adhesive for additional bonding between the two shells.

The objects of the invention are accomplished by a ski construction wherein a molded upper shell forms a deck portion with depending flanges which fit within a molded lower shell having upwardly projecting flanges. The lower shell also is provided with a trough which extends continuously around the perimeter of the ski inwardly of the upwardly projecting flange. The trough receives the lower end of the upper flange and acts to collect any excess adhesive that may drain from between the flanges during the curing operation to act as an additional bonding structure to increase the strength and sealing between the mating shells of the ski. In one embodiment of the invention, the ski is filled with foam which serves to maintain the upper and lower surfaces of the ski in spaced relationship and also acts as an adhesive. In another embodiment of the invention, the interior of the ski is provided with longitudinally extending ribs formed by mating flanges of the upper and lower shells extending generally longitudinally of the ski. The longitudinally extending flanges serve to maintain the upper and lower surfaces of the skis in spaced relationship and also to form buoyancy chambers. In both embodiments of the invention, provision is made for adding a fin, if one should be desired, by providing mounting portions to receive fasteners. Similarly, the upper surfaces of the skis have reinforced portions extending midway of the ski for the purpose of receiving fasteners for any one of a selected number of foot bindings that manufacturers may wish to apply. The method of forming the foam filled ski includes the formation of an aperture at one end of the ski so that during the foaming step the mating shells of the ski are tilted to elevate the aperture to facilitate the escape of air and release of excess gas resulting from the foaming operation. In both embodiments of the invention, the ski shells are formed of sheet molding compound.

These and other objects of the invention will become apparent from the following description and from the drawings in which:

FIG. 1 is a top plan view of the water ski embodying the invention;

FIG. 2 is a side elevation of the water ski seen in FIG. 1;

FIG. 3 is a cross-sectional view at an enlarged scale taken on line 3—3 in FIG. 1;

FIG. 4 is a cross sectional view similar to FIG. 3 but taken on line 4—4 in FIG. 1;

FIG. 5 is a cross sectional view similar to FIG. 4 taken on line 5—5 in FIG. 1;

FIG. 6 is a cross sectional view of the end portion of the ski taken on line 6—6 in FIG. 1;

FIG. 7 is a cross sectional view of the forward end of the water ski taken on line 7—7 in FIG. 1;

FIG. 8 is a top plan view of the rear portion of the ski incorporating a fin;

FIG. 9 is a side elevation of the rear end of the ski seen in FIG. 8 taken on line 9—9;

FIG. 10 is a cross sectional view taken on line 10—10 in FIG. 9;

FIG. 11 is a diagrammatic view of a fixture in which the ski can be assembled; and FIG. 12 is a cross sectional view similar to FIG. 3 but showing another embodiment of the invention.

A water ski embodying the invention is designated generally at 10 and has a substantially flat body portion 12 with an upturned bow or forward portion 14. As seen in FIG. 1, the ski has gently curved opposite sides 16 merging with a blunt forward tip 18 and a curved stern or end portion 20. The ski 10 also has a top or deck surface 22 and a bottom surface 24 spaced therefrom.

The water ski 10 includes an upper shell 26 and a lower shell 28 which are joined together to form a closed cavity 30. The shells 26 and 28 are made of sheet molding compound which can be a partially polymerized resin reinforced with fiberglass that can be formed and completely polymerized or cured in heated dies or presses. Sheet molding compound is available in a variety of forms with varying densities of fiberglass filament in a matrix of resin.

As seen in FIGS. 3 through 7 showing various cross sections of the ski, the upper shell 26 includes a continuous depending flange 32 which is disposed inboard of the perimeter of the upper shell 26 a distance sufficient to accommodate an upwardly projecting flange 34 forming part of the lower shell 28. The depending flange 32 and upwardly projecting flange 34 have generally complementary facing surfaces 36 and 38. The flanges 32 and 34 as well as the surfaces 36 and 38 extend continuously around the entire periphery of the upper and the lower shell 26 and 28 and when the surfaces 36 and 38 are bonded together, a water tight construction is formed.

The lower shell 28 has a second upwardly projecting flange 40 in parallel spaced relationship to upwardly projecting flange 34 to form a trough or groove 42 which can be seen in FIGS. 3 through 7. The groove 42 serves the purpose of collecting excess uncured adhesive and helps prevent the flow of adhesive out of the space between the surfaces 36 and 38. Upon curing in the groove 42 the adhesive acts to more tightly bond with the lower edge 44 of the depending flange 32 of the upper shell 26.

The thickness of the bottom surface 24 of the lower shell 28 is substantially uniform throughout the ski. However, the thickness of the deck 22 of the upper shell 26 varies. For example, as seen in FIGS. 1 and 4, the underside of the deck 22 has a generally thickened portion 46 with a generally U-shaped configuration as seen in broken line in FIG. 1. The thickened portions serve to reinforce the deck and offers an additional foundation for receiving fasteners by which foot bindings can be fastened in various positions to the ski 10. Bindings that can be attached to skis take a large variety of forms and the thickened portion 46, which occupies approximately one third of the middle length of the ski, makes it possible to select from a variety of such bindings and gives the option of mounting a single binding when the skis are for use as a pair or mounting a pair of bindings when the ski is to be used for slalom skiing.

Although the deck 22 of the upper shell 26 can be generally flat from side to side for the entire length of the ski, the bottom surface 24 can have portions curved or tunneled as indicated at 49 in FIGS. 3 and 4.

In some forms of skiing, the ski is provided with a fin 50 adjacent its stern or aft end 20. As seen in FIGS. 8 through 10, the fin 50 may take a variety of forms, two of which can be seen in FIG. 9, one in full line and one in broken line.

The fin 50 is generally T-shaped in cross section as viewed in FIG. 10 with a vertical portion 51 and a horizontal mounting flange 52. Fin 50 is secured to the ski 10 by inserting it through a slot 53 in the deck 22 and a slot 54 in the bottom portion 24 which can be routed in the surfaces of the ski 10 in the event that a fin is to be fitted to the ski. Otherwise, the surfaces may remain intact. At the time of making the ski 10, the upper shell 26 is provided with bosses 56 molded integrally at the underside of the deck 22 for the purpose of receiving threaded screw fasteners 58 passing through the mounting flange 52. The fin 50 can be made of plastic material or if desired can be formed of aluminum or the like.

The ski 10 is formed by first molding the upper and lower shells 26 and 28 and allowing them to cure. Thereafter, the shells are assembled in a fixture indicated generally at 70 in FIG. 11. The fixture 70 includes a lower part 72 and an upper part 74 which are hinged relative to each other at 76. Both parts 72 and 74 also are swingable about a pivot 78.

The shells 26 and 28 are assembled by first placing the lower shell 28 on the fixture part 72 when it is in its generally horizontal position. Thereafter, the surface 38 is completely covered with a coating of adhesive around the entire perimeter of the shell 26. At that time a predetermined quantity of liquid foamable resin is poured into the open lower shell 28. Subsequently, the upper shell 26 is placed in mating relationship with the lower shell 28 and the fixture portion 74 is brought to a closed position relative to the lower fixture part 72. With the upper and lower shell 26 and 28 in mating relationship and with the fixture members 72 and 74 clamped together, the arrangement is moved to an angled position as shown in cross section and full lines in FIG. 11. During the foaming action, a pressure is exerted on the upper and lower shells 26 and 28 to the order of 5 to 10 psi, dependent on the quantity of foaming agent and the density of foam that is desired.

During such foaming, gases are generated which must be allowed to escape together with any air originally in the cavity 30. For this purpose rear end 20 of the deck 22 is provided with an opening 79 seen in FIG. 6 which is in alignment with a large opening 80 in the fixture member 72. With the fixture 70 moved to the angled position, the exhaust opening 79 is in an elevated position to insure that gases can escape. After the foaming operation is complete, the hole 79 can be plugged mechanically or with the addition of plastic material.

The method of assembling the ski 10 can be varied by omitting the application of adhesive to the flange surfaces 36 and 38. In that case, the foam resin which is deposited in the lower shell 28 is selected to be of a sufficient quantity to be forced into the spaces between the flanges 32 and 34. After the foam is polymerized, its adherence to the flanges 32 and 34 as well as the remaining inner surfaces of the upper and lower shells 26 and 28 is sufficient to maintain the skis in assembled condition.

Another embodiment of the invention is seen in FIG. 12 which is a cross section of the ski similar to that shown in the prior embodiment in FIG. 3. In the embodiment of FIG. 12, an upper shell 81 is provided with a depending flange 82 extending continuously around its entire perimeter in much the same manner as the flange 32 of the prior embodiment. Similarly, the outer periphery of a lower shell 84 is provided with upwardly projecting flanges 86 and a glue receiving groove 88 all generally similar to the prior embodiment. However, the upper shell 81 is provided with additional depending flanges 90, 91 and 92 which mate respectively with upwardly projecting flanges 93, 94 and 95 formed integrally with lower shell 84. Each of the lower flanges 93, 94 and 95 has an adjacent glue receiving groove 96. The flanges 90 through 95 extend substantially continuously for the full length of the ski and serve the purpose of adding rigidity.

In this embodiment of the invention adhesive can be placed not only around the entire periphery of the ski 81 between the flanges 82 and 86, but also between the surfaces of the adjacent flanges 90 and 93, 91 and 94, and 92 and 95. However, in this embodiment, the spaces within the ski 81 and between the various bonded flanges are not filled with foam. The flanges themselves serve the purpose of maintaining the deck and bottom portion in spaced relationship to each other and form air chambers to provide buoyancy.

Two embodiments of a water ski have been disclosed both of which make possible the mounting of various forms of hardware and the option of adding a fin in which mating shells form upper and lower portions of the ski and are maintained in spaced relationship in one embodiment by a foam core and in another embodiment by longitudinally extending flanges or ribs. The edges of the skis are formed by mating flanges which are bonded together to add strength to the ski and to afford a water tight chamber which can be filled with foam material or which can be left empty to afford buoyancy for the water tight ski.

The embodiments of the invention in which an exclusive property or privilege is claimed are defined as follows:

1. The method of forming a ski having matching top and bottom parts forming a cavity filled with foam core material, comprising the steps of forming a top ski part having a depending continuous flange at its perimeter, forming a lower ski part having an upwardly extending continuous flange having a trough therein spaced from said depending flange and having a surface complementary to a surface of said depending flange of said top ski part, positioning said bottom part horizontally, applying a coating of adhesive to the inner surface of said upwardly extending flange, applying a predetermined amount of foam resin to the cavity formed by said bottom part and said upwardly extending flange, placing said top part in mating relationship to said bottom part with said complementary surfaces of said depending flange and upwardly extending flange in adjacent abutting relationship to each other to form a cavity with excess adhesive between depending flange and said upwardly extending flange being received in said trough, and placing said top and bottom parts in a fixture to hold said top and bottom parts relative to each other while the foam resin expands and the adhesive cures.

2. The method of forming a ski set forth in claim 1 and further comprising forming said bottom part with said trough adjacent the inner surface of the upwardly extending flange and applying the coating of adhesive to the inner surface of said upwardly extending flange in sufficient quantity for excess adhesive to flow into said trough and to be trapped thereby for bonding with the bottom of said depending flange.

3. The method of claim 1 wherein an opening is formed at the rear end of one of said ski parts and wherein said top and bottom parts and said fixture are tilted as a unit to elevate said opening to permit the escape of gases during curing of said foam resin.

* * * * *